Dec. 12, 1933.  W. BAIER  1,939,195
CLOSING DEVICE FOR SLIDING ROOFS OF MOTOR VEHICLES
Filed Sept. 1, 1932  2 Sheets-Sheet 1

Inventor:
Wilhelm Baier
by
Attorney.

Dec. 12, 1933.                W. BAIER                1,939,195
           CLOSING DEVICE FOR SLIDING ROOFS OF MOTOR VEHICLES
                     Filed Sept. 1, 1932        2 Sheets-Sheet 2
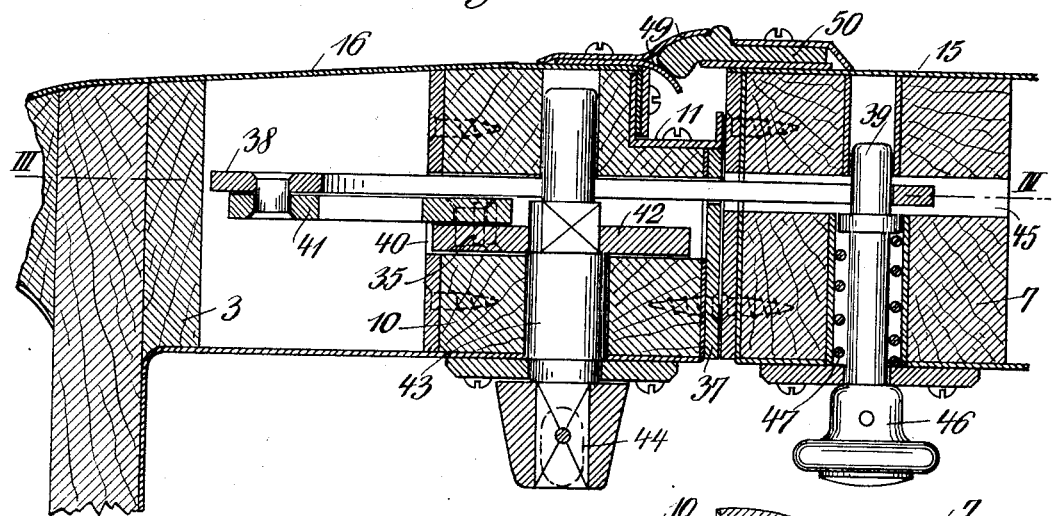
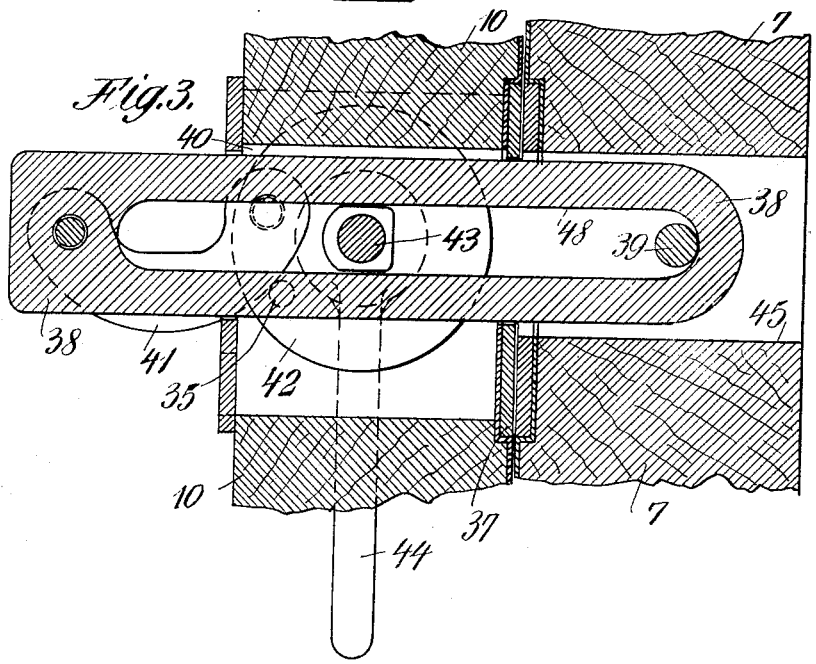
Inventor:
Wilhelm Baier
by
Attorney.

Patented Dec. 12, 1933

1,939,195

UNITED STATES PATENT OFFICE 1,939,195

CLOSING DEVICE FOR SLIDING ROOFS OF MOTOR VEHICLES

Wilhelm Baier, Stockdorf, near Munich, Germany

Application September 1, 1932, Serial No. 631,390, and in Germany April 19, 1932

4 Claims. (Cl. 296—137)

This invention relates to sliding roofs for motor vehicles in which, in an aperture in the roof of the vehicle, a plurality of guide hoops are arranged which carry the foldable roofing material. When the sliding roof is in closed position the main or closing hoop, which is arranged at the front end of the foldable roofing material, is locked on a stationary transverse beam in the roof aperture. The pulling of the closing hoop towards the transverse beam when closing the roof is difficult owing to the shrinkage of the roofing material which occurs in the course of time. The closing device fitted on the transverse beam must therefore be so constructed that by means thereof the closing hoop can be pulled towards the beam by leverage along the last 3 cms. of the closing path. As the closing device is usually arranged on the under side of the transverse beam and of the closing hoop, the two closing parts on the upper edge of their abutting surfaces gape under the action of the stretched roofing material and form a wedge-shaped gap which cannot be effectively closed.

The invention relates to a closing device for sliding roofs which is so constructed and arranged, that the transverse beam and the closing hoop are pressed with their entire abutting surfaces tightly one against the other and that two packing means on the upper abutting edges of the closing parts are tightly pressed the one into the other in wedge shape. For this purpose the operative parts of the closing device are arranged in horizontal slots of the transverse beam and of the closing hoop at half the height of their abutting surfaces, and only operating handles for the closing elements are arranged on the under side of the two parts to be closed.

An embodiment of the invention is illustrated by way of example in the accompanying drawings in which:—

Fig. 2 is a cross section on a larger scale taken on line II—II of Fig. 1, the closing device being closed.

Fig. 3 is a horizontal section on line III—III of Fig. 2.

Figure 1:
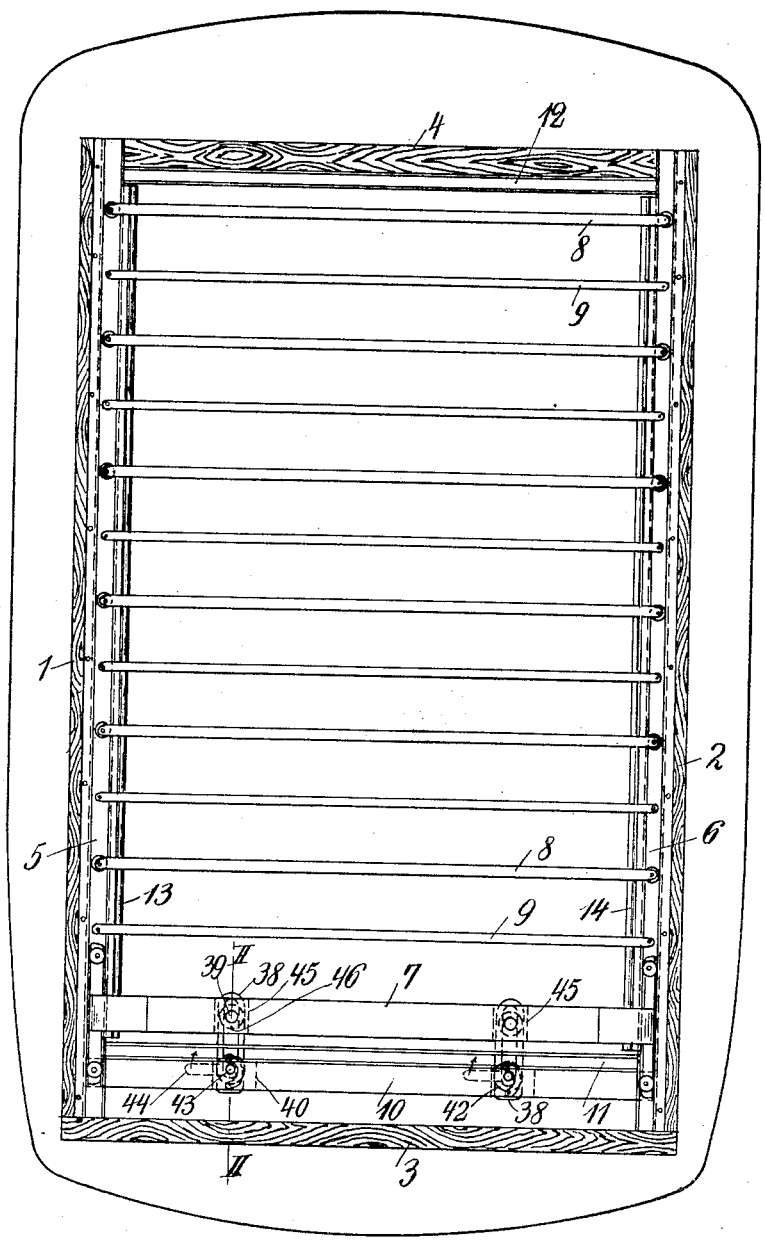
Fig. 1 shows in top plan view a sliding roof without roofing material, the closing hoop together with the transverse beam being in the position before closing.

A frame 1, 2, 3, 4 is arranged in a rectangular aperture in the roof of the vehicle. Guides 5, 6 for the hoops 7, 8 and 9 are arranged on the longitudinal arms of the frame. The hoops are attached to the foldable roofing material. The hoop 7, arranged on the front edge of the foldable roofing material, is the closing hoop. A transverse beam 10 is rigidly mounted on the end of the roof aperture. Water gutters 11 and 12 are arranged transversely on the beam 10 and on the frame arms 4 and slide guides 13 and 14 for the shiftable hoops are provided on the guides 5 and 6. The foldable roofing material is designated by 15 and the fixed portions thereof by 16.

At about one half the height or slightly above this point of each of the closing elements 10 and 7 registering horizontal slots 40, 45 respectively are provided. A longitudinally slotted latch 38, mounted in the slot 40 in the transverse beam 10 serves as locking element and is guided in a cover plate 37 on the abutting surface of the transverse beam. This latch projects from the slot 40 of the transverse beam and is opposite the slot 45 in the closing hoop or penetrates therein when the closing hoop is pushed close to the transverse beam. A pull bolt 39 engages vertically in the slot 45 of the closing hoop and carries a knob 46 on the under side of the hoop in the interior of the vehicle and can be pulled out of the slot 45 of the hoop in opposition to the action of a spring 47 bearing against a collar on the bolt. When the latch 38 projects into the slot 45 of the closing hoop, the bolt 39 also extends through the slot 48 of the latch, and the closing hoop can then be pulled on this pull bolt 39 eccentric-like against the stationary beam 10 by means of a hand lever 44. The bolt 43 of the hand lever 44 extends through the slot 40 of the transverse beam and carries in the slot a disc 42 keyed on the bolt. A curved link 41 is mounted at one end on this disc and is hingedly connected at its other end to the latch 38. By turning the lever 44 the bolt 43 and the disc 42, the link 41 and consequently the latch 38 is shifted, effecting the locking or unlocking position of the closure. The locking position is maintained, as the fulcrum of the element 41 on the disc 42 can be turned through a few degrees beyond its dead centre position. This extreme position is limited by a pin 35 on the disc 42, which pin abuts against the link 41.

For the purpose of packing the two closing elements 10 and 7 in closed position a bifurcated or fork-shaped metal bar 49 is arranged on the upper edge of the abutting surface of the beam 10, and opposite this bar a rubber strip 50 is arranged on the closing hoop. This strip 50 is so wide that it must be pressed into the bifurcated bar 49 when closing the roof thereby forming a tight packing. Two locking devices of the type described are preferably arranged at a suitable distance apart. When opening the roof, the two levers 44 are operated consecutively, which can be effected without jamming owing to the slots in the bolts 38, whereupon the two bolts 39 are pulled out and the hoop 7 is at the same time pushed away from the fixed beam 10 by means of the knobs 46. The two latches then project a distance from the fixed beam 10. When closing the sliding roof, the pull bolts 39 on the closing hoop are pulled out in the same manner and the hoop shifted as near as possible to the beam 10, the knobs 46 on bolts 39 serving as handles. The closing hoop can, according to the invention, be shifted by hand only up to about 3 cms. from the beam 10, owing to the stretching of the roofing material. If the spring bolts 39 are released, they engage under the action of the springs 47 into the slots 48 of the two latches 38 which during the approaching of the closing hoop to the beam 10, penetrate into the slots 45 of the hoop. The complete tight closing of the elements 10 and 7 is effected by means of the two levers 44. Any water penetrating through the packing is collected in the gutter provided on the abutting surface of the transverse beam 10.

I claim:

1. A closing device for sliding roofs of motor vehicles, comprising in combination with the roof of the vehicle having a rectangular aperture, a transverse beam having a horizontal slot rigidly mounted in the aperture in said roof, a closing hoop shiftable in the aperture of said roof having a horizontal slot registering with the slot in said beam, a latch in the slot of said beam having a longitudinal slot and projecting from the slot in said beam and adapted to penetrate into the slot in said hoop when said hoop is approached to said beam, a pull bolt in said hoop extending vertically through the slot thereof adapted to engage in the slot in said latch, means on said beam for shifting said latch and hoop towards said beam by means of said pull bolt, means for pulling said pull bolt out of the slot in said latch, and means for packing the contact point between said hoops and said beam.

2. A closing device for sliding roofs of motor vehicles, comprising in combination with the roof of the vehicle having a rectangular aperture, a transverse beam fixed in the aperture of said roof having a horizontal slot, a closing hoop slidable in the aperture of said roof having a horizontal slot registering with the slot in said beam, a latch extending from the slot in said beam adapted to enter the slot in said hoop when said hoop is approached to said beam and having a longitudinal slot, a bolt extending vertically through the slot in said beam engaging the slot in said latch, a disc fixed on said bolt in the slot in said beam, a link connected at one end to said disc and at the other end to said latch, a handle on said bolt under said beam adapted to turn said bolt to shift said latch, a pull bolt in said closing hoop adapted to engage in the slot in said latch when said hoop is approached to said beam, means for pulling said pull bolt out of the slot in said latch, and means for packing the contact surface between said beam and said hoop.

3. A closing device for sliding roofs of motor vehicles, comprising in combination with the roof of the vehicle having a rectangular aperture, a transverse beam fixed in said aperture in said roof having a horizontal slot, a closing hoop slidable in the aperture in said roof having a horizontal slot registering with the slot in said beam, a latch having a longitudinal slot mounted in and projecting from the slot in said beam adapted to extend into the slot in said hoop when said hoop is approached to said beam, a pull bolt in said hoop extending vertically in the slot in said hoop and engaging in the slot in said latch, a collar on said pull bolt, a spring bearing against said collar adapted to hold said pull bolt in engagement with the slot in said latch, a knob on the end of said pull bolt adapted to pull said pull bolt out of engagement with the slot in said latch against the action of said spring thereby releasing said latch, means on said beam for shifting said latch and for pulling said closing hoop towards said beam, and means for packing the contact point between said beam and said hoop.

4. A closing device for sliding roofs of motor vehicles, comprising in combination with the roof of the vehicle having a rectangular aperture, a transverse beam fixed in said aperture having a longitudinal slot, a closing hoop slidable in said aperture having a longitudinal slot registering with the slot in said beam, a latch in the slot in said beam having a longitudinal slot, a pull bolt in said hoop adapted to engage in the slot in said latch when said hoop is approached to said beam, means in said beam for shifting said latch and for pulling said hoop towards said beam by means of said pull bolt, a bifurcated metal bar on the upper abutting edge of said beam, and a rubber strip on the opposite edge of said closing hoop adapted to fit in said bifurcated bar and to be pressed in the gap in said bar to form a tight closure when said hoop is pulled against said beam.

WILHELM BAIER.